Aug. 8, 1961  J. A. CHILMAN  2,995,190
IMPELLERS
Filed Nov. 30, 1959
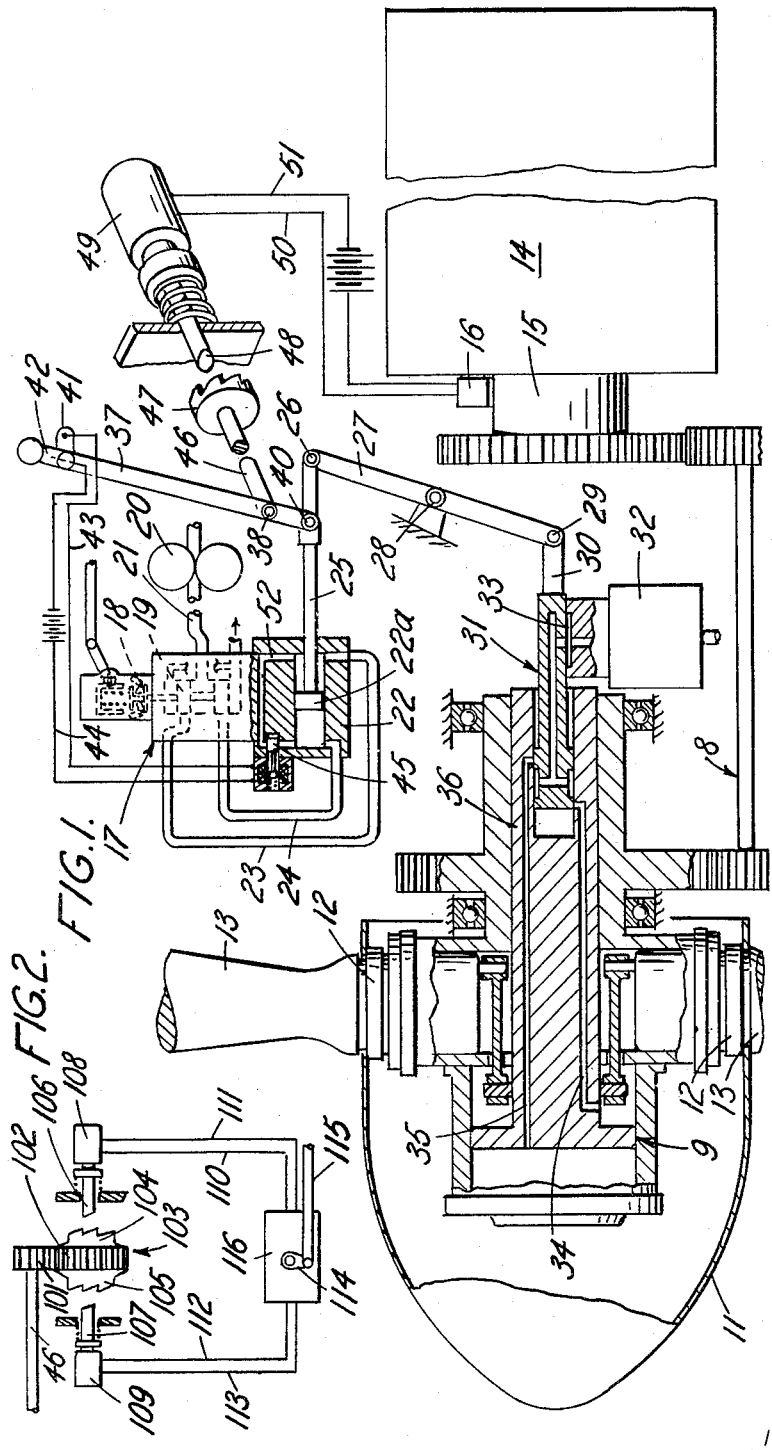
INVENTOR
JOHN ALFRED CHILMAN
BY Mawhinney & Mawhinney

United States Patent Office 2,995,190
Patented Aug. 8, 1961

2,995,190
IMPELLERS
John Alfred Chilman, Gloucester, England, assignor to Rotol Limited, Gloucester, England, a company of Great Britain
Filed Nov. 30, 1959, Ser. No. 856,077
Claims priority, application Great Britain Dec. 4, 1958
11 Claims. (Cl. 170—135.72)

This invention relates to impellers and is concerned with impeller installations including a variable pitch impeller.

According to the invention there is provided an impeller installation comprising an impeller apparatus having a member the pitch of which is adjustable, impeller driving means for driving the rotor of the impeller apparatus, a manually operable means connected to vary the pitch of the member and pitch limiting means operatively connected to the driving means and operating when the impeller driving means operates at a pre-selected operating condition to limit movement of the member in at least one direction. The preselected operating condition may be a condition of speed or of torque or of power. The pitch limiting means may be operable to limit pitch fining movements of the member when the impeller driving means speed increases beyond a predetermined maximum or may be operable to limit pitch coarsening movements of the member where these movements would lead to the impeller driving means stalling.

Preferably the pitch limiting means is operable to engage the manually operated means to limit movement thereof in at least one direction.

The installation may preferably comprise a one-way clutch e.g. a ratchet and pawl, the pitch limiting means and the manually operable means engaging through the one-way clutch mechanism.

Preferably the manually operated means is connected to vary the pitch of the member through a linkage, which linkage incorporates a part movable under the influence of an hydraulic motor and by-pass means operable to render said motor inoperative. The installation may further comprise a source of pressure fluid, a drain, conduit means from the source and said drain for the motor, valve means in said conduit means and operative to connect the motor selectively to the source and the drain and governor means connected to operate the valve means.

Two embodiments of the invention will be now described by way of example with reference to the accompanying diagrammatic drawings, of which FIGURE 1 shows means for preventing a manual control member of the type described from movement in the pitch fining direction under conditions where such movement would be undesirable, and FIGURE 2 shows the principle applied for the limitation of movement of the manual control member in both pitch fining and pitch coarsening directions.

Referring to the drawing an impeller apparatus in the form of an hydraulic variable pitch propeller 11 comprises a hub 12 and blades 13 mounted in the hub so as to be adjustable as to their pitch in known manner by a pitch change motor 9. The propeller 11 is arranged to be driven by an impeller driving means in the form of a prime mover 14, for example a gas turbine engine through a transmission 8. The prime mover incorporates a reduction gear 15 upon which is mounted a device 16 of known construction which is responsive to the torque, thrust or speed of the prime mover. In the present arrangement, the device 16 is as described and claimed in the complete specification of British Patent No. 715,133. Alternatively the device 16 may be a thrust sensitive unit conveniently arranged in association with one of the bearings of the reduction gear or a speed responsive unit driven conveniently from the reduction gear.

The pitch adjustment of the propeller is controlled by a variable datum constant speed unit 17 incorporating a speed governor 18 and a valve 19. Associated with the unit 17 is a pump 20 which draws fluid from a sump (not shown) and delivers it under pressure to the valve 19 through a conduit 21. The valve 19 controls the passage of the pressure fluid from the pump to an hydraulic motor or amplifier 22 by way of either pipe 23 or 24 depending upon the nature of the pitch change, that is, whether the blades are to be moved to a finer or coarser pitch. The output member 25 of the hydraulic amplifier 22 is pivotally connected at 26 with a lever 27 itself pivotally mounted on a fixed part of the aircraft structure at 28. The opposite end of the lever 27 is pivotally connected at 29 with the displaceable element 30 of a control valve unit 31 which is arranged to control the passage of high pressure fluid from a pump 32 which draws fluid from a sump (not shown) and delivers it to the interior of the valve element 30 through a sliding connection 33. The control valve unit 31 is connected through conduits 34 and 35 in the piston rod 36 of pitch change motor 9 with the fine and coarse pitch sides, respectively, of the motor.

The piston rod 36 follows up movement of the displaceable element 30 to cancel the pitch changing movement upon attainment of the pitch change demanded by the element 30. The displaceable element 30 is arranged to be fixed with the prime mover in the rotational sense, while the body of the control valve unit 31 and the piston rod 36 is rotatable with the propeller 11.

A manual control lever 37 is pivotally mounted intermediate its ends at 38 and pivotally connected at 40 at its lower end to the rod 25. A lever 41 and switch 42 are provided near the upper end of the lever 37, the switch being in circuit 43, 44 with a solenoid operated valve 45 in a by-pass conduit 52 joining the two sides of the hydraulic amplifier 22. When the lever 41 is lifted the switch 42 is closed, thus moving the valve 45 to open by-pass conduit 52 which then permits free-stroking of the piston 22a of the hydraulic amplifier 22 for free manual control of the element 30 by the lever 37.

A shaft 46 coaxial with the pivot 38 is formed integrally with the lever 37 and comprises a ratchet wheel 47 at the end thereof remote from lever 37. A pawl 48 is provided in association with the ratchet wheel 47 and is movable into and out of engagement with the ratchet wheel 47 under the control of a solenoid 49. The pawl is carried on the armature of the solenoid 49 which is in electrical connection through leads 50 and 51 with the device 16.

The device 16 may be interconnected with the throttle valve of the engine fuel system such that its operation is only effective at throttle setttings at which there is no possibility of the selection of a pitch which is too coarse causing stalling of the engine.

During governor control of the propeller the lever 37 follows movement of the hydraulic amplifier 22 and valve element 30 and is therefore indicative of the governing function. Under these conditions the pitch of the propeller is adjusted under the control of the constant speed unit 17, the hydraulic amplifier 22 and the valve unit 31 to maintain the propeller speed at the datum setting.

When the pilot desires to change over to manual control, he lifts the lever 41 thereby closing switch 42 and moving the valve 45 to open by-pass conduit 52 to permit free-stroking of the piston 22a of the hydraulic amplifier 22. Pitch adjustment may then be performed manually by movement of lever 37 about its pivot mounting 38. Movement of the rod 25 in one direction or the other displaces the lever 27 about its pivot 28, thereby displacing element 30. The latter, in known manner, controls the flow of high pressure fluid to the propeller pitch change motor 9 through either conduit 34 or 35, depending on whether pitch fining or pitch coarsening is selected.

Under certain operating conditions a tendency may arise for the pilot to select too fine a pitch. Since this may well result in propeller overspeeding, the device 16 is provided to prevent the pilot from inadvertently moving his control lever too far.

Since it would be undesirable for the device 16 to be effective under certain phases of engine and propeller operation it may be arranged that the device is connected with the throttle valve of the engine fuel system so that the device is isolated during such phases of operation.

When its operation is effective the device 16 upon detecting a predetermined condition of under-thrust, under-torque or overspeed closes its switch and thereby causes current to be transmitted through circuit 50, 51 to energise the solenoid 49 so that the pawl 48 engages the ratchet 47 to prevent further adjustment of the lever 37 in the pitch fining direction. The ratchet does however still permit adjustment of the lever 37 in the pitch coarsening direction. The device 16 acts to break the circuit, and hence to cause withdrawal of the pawl 48, when the device 16 no longer detects the said predetermined condition.

The device 16 may alternatively be arranged similarly to prevent pitch coarsening adjustment of the lever 37 upon detection of a predetermined condition of over-thrust, over-torque or underspeed condition. In these circumstances the ratchet wheel 47 would be of the opposite hand. Over-coarsening under manual control is undesirable as it may give rise to stalling of the engine.

The device 16 may be duplicated in convenient manner to be responsive to under-thrust and over-thrust, under-torque and over-torque or underspeed and overspeed and so correlated with the throttle valve of the engine fuel system as to be capable of imposing limitations on the manual control lever 37, both in the pitch fining and pitch coarsening directions. FIGURE 2 shows a modification which may be applied to the construction of FIGURE 1 to achieve this.

The shaft 46 carries a pinion 101 which meshes with a gear ring 102 integral with a double ratchet wheel 103, having ratchet faces 104 and 105 of opposite hand. Pawls 106 and 107 respectively are capable of engagement with the ratchet faces 104 and 105 of opposite hand. Pawls 106 and 107 respectively are capable of engagement with the ratchet faces 104 and 105 upon energization of solenoids 108 and 109.

The solenoid 108 is connected with a device 116 similar to device 16 of the first described embodiment by means of electrical transmissions 110 and 111, while the solenoid 109 is connected with the device 116 by means of electrical transmissions 112 and 113. The device 116 is interconnected in desired manner (not shown) with the engine fuel system control by means of a lever 114 and rod 115.

The device 116, which like device 16 of FIGURE 1 is mounted upon the engine reduction gear, is thrust responsive, torque responsive or speed responsive, that part of the device associated with solenoid 108 being responsive to under-thrust, under-torque or overspeed, and that part associated with solenoid 109 being responsive to over-thrust over-torque or underspeed.

Thus the construction of FIGURE 2 ensures that over-coarsening and over-fining under manual control cannot occur.

It will be understood that in the arrangement described the device 16 and 116 are equally effective in emergency when the propeller system is operating under governor control, since in positively locking the lever 37 in one direction or the other, or both, they also lock the valve element 30 and hence the pitch change motor 9.

I claim:

1. An impeller installation comprising an impeller apparatus having a member, the pitch of which is adjustable, impeller driving means for driving the impeller apparatus, a manually operable means connected to vary the pitch of the member and pitch limiting means operatively connected to the driving means and operating when the impeller driving means operates at a predetermined operating condition to engage the manually operable means to limit movement thereof in at least one direction.

2. An impeller installation as claimed in claim 1, wherein the predetermined operating condition is a condition under which the power absorption demands of the impeller tend to exceed the power developed by the driving means.

3. An impeller installation as claimed in claim 1 comprising a one-way clutch mechanism, the pitch limiting means and the manually operable means engaging through the one-way clutch mechanism.

4. An impeller installation as claimed in claim 3 wherein the one way clutch mechanism comprises a ratchet and pawl.

5. An impeller installation as claimed in claim 4 in which the manually operable means comprises a shaft and a lever mounted on the shaft to pivot the shaft and wherein said ratchet comprises a ratchet wheel which is mounted on the shaft and which is engaged by the pawl.

6. An impeller installation as claimed in claim 4 wherein the means operatively connected to said impeller driving means comprises a current transmitter connected to said impeller driving means to transmit current when said impeller driving means operates at said predetermined operating conditions, a solenoid having a coil connected to said current transmitter to be energised by current transmitted, and said solenoid also comprising an armature which carries said pawl, so that said pawl is moved into engagement with said ratchet when said coil is energised.

7. An impeller installation as claimed in claim 1 in which the manually operable means is connected to vary the pitch of the member through a linkage which linkage incorporates a part movable under the influence of an hydraulic motor and bypass means operable to render said motor inoperative.

8. An impeller installation as claimed in claim 7 further comprising a source of pressure fluid, a drain, conduit means from the source and said drain to the motor, valve means in said conduit means and operative to connect the motor selectively to the source and the drain and governor means connected to operate the valve means.

9. An impeller installation as claimed in claim 7 wherein the manually operable means incorporates a manual switch operable to open and close the bypass means.

10. An impeller installation as claimed in claim 1 in which the manually operable means comprises a lever carried to pivot with a shaft, wherein the shaft is in positive driving connection with a rotatable member carrying two ratchets of opposite hand and wherein two pawls are provided operable by the pitch limiting means to engage respectively the two ratchets.

11. An impeller installation comprising a variable pitch propeller having a plurality of propeller blades; a gas turbine driving the propeller; means to vary the pitch of the propeller blades comprising an hydraulic pitch change motor the movable member of which is operatively connected to the propeller blades, fine and coarse pitch conduits extending through said member and leading respectively to the fine and coarse pitch sides of the motor; first and second sources of pressure fluid; a displaceable member slidable relative to said movable member to connect said first source selectively to said fine pitch conduit and to said coarse pitch conduit; a linkage connected to move said displaceable member, said linkage incorporating an hydraulic amplifier jack; jack conduits to either side of said jack; a governor actuated valve operable to connect said second source selectively to either side of said jack, a manual control lever connected to said linkage; a bypass conduit connecting both sides of said jack; a shut off valve in said bypass conduit; a solenoid energisable to move said shut off valve out of said bypass conduit; a switch on said lever closeable to energise said solenoid; a first part connected to said manual control lever; a second part movable to engage said first part to limit movement thereof in at least one direction; means to detect when said gas turbine operates at a predetermined operating condition and to move said second part to engage said first part when said preselected operating conditions are detected.

References Cited in the file of this patent

UNITED STATES PATENTS

| | | |
|---|---|---|
| 2,796,138 | Lambeck | June 18, 1957 |
| 2,869,650 | Fairhurst | Jan. 20, 1959 |

FOREIGN PATENTS

| | | |
|---|---|---|
| 664,780 | Great Britain | Jan. 9, 1952 |
| 715,133 | Great Britain | Sept. 8, 1954 |